July 11, 1967 R. S. MACKAY 3,330,152
CONSTANT FORCE APLANATION TONOGRAPHY
Filed Nov. 16, 1964 2 Sheets-Sheet 1

INVENTOR.
RALPH S. MACKAY
BY
ATTORNEYS

July 11, 1967  R. S. MACKAY  3,330,152
CONSTANT FORCE APLANATION TONOGRAPHY
Filed Nov. 16, 1964  2 Sheets-Sheet 2
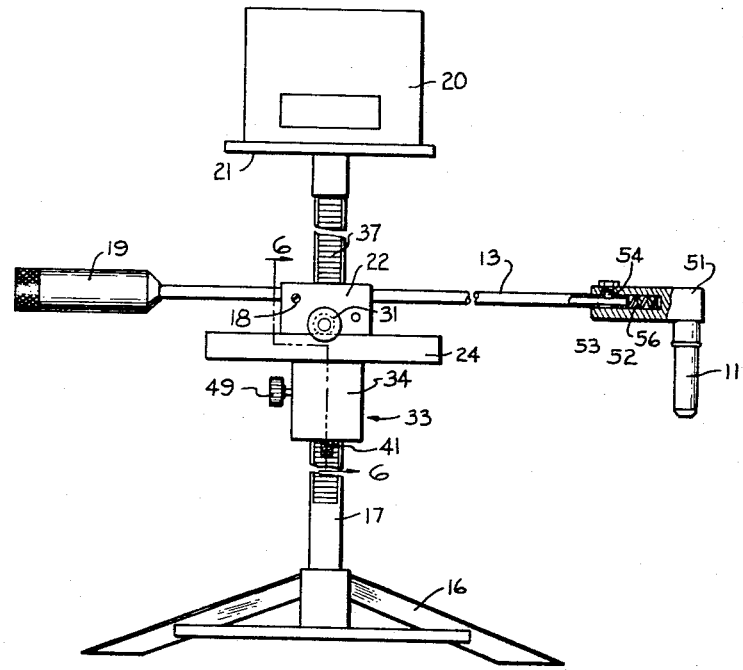
Fig. 5
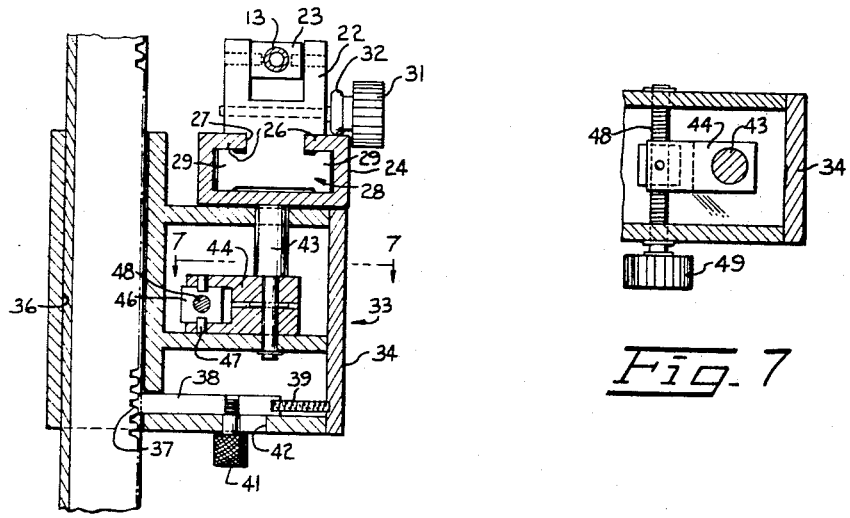
Fig. 6
Fig. 7
INVENTOR.
RALPH S. MACKAY
BY
ATTORNEYS

United States Patent Office 3,330,152
Patented July 11, 1967

3,330,152
CONSTANT FORCE APLANATION TONOGRAPHY
Ralph S. Mackay, Berkeley, Calif., assignor to Biotronics, Inc., Oakland, Calif., a corporation of California
Filed Nov. 16, 1964, Ser. No. 411,508
4 Claims. (Cl. 73—80)

ABSTRACT OF THE DISCLOSURE

A method of measuring the facility of outflow of fluid through ducts within the eye by applying a constant force to the eyeball over a period of time while measuring and recording the variations in intraocular pressure within the eyeball during such time.

---

This invention relates to measurement of the facility of outflow of fluid through ducts within the eye, and is more particularly directed to a method and apparatus for accomplishing such measurement with extreme precision and with substantially no discomfort to the patient.

Glaucoma is a disease marked by hardness of the eyeball which leads to irreversible blindness, although if the disease is discovered in its early stages, treatment may be administered which will prevent blindness. Glaucoma is characterized by abnormally high pressure within the eyeball, frequently in conjunction with an abnormally low facility of outflow of liquid through the ducts thereof, i.e., the canals of Schlemm. Heretofore, measurement of the intraocular pressure has proven to be a valuable tool in the early detection of glaucoma. In recent years extremely accurate tonometers have been developed which enable the pressure measurement to be made in a highly expeditious and painless manner. The tonometers include a probe having a tip equipped with a pressure sensitive transducer which is so arranged that upon urging the tip of the proble briefly and gently against the eyeball, an electrical signal is generated which is directly and accurately representative of the internal eyeball pressure. The signal is employed to drive a strip recorder whereby a graph of the pressure during the brief encounter of the probe with the eyeball is obtained. The graph provides an accurate indication of the intraocular pressure, which if observed to be abnormally high suggests the posssibility of the patient having glaucoma. It will be appreciated, however, that the tonometer measurement alone is not conclusive evidence of the existence of glaucoma, and that further diverse corroborative tests are required to make a complete diagnosis. One test which could be of value in this regard is the measurement of the previously mentioned facility of outflow of liquid through the ducts of the eyeball. Such measurement of outflow is termed tonography, as opposed to tonometry which relates to the measurement of intraocular pressure. Unfortunately, previous methods of tonography have not yielded data which could be interpreted as a reliable indication of the facility of outflow. For example, it has been the usual practice to depress the eyeball in a localized area with an indentation tonometer and observe the change in reading, as an interpretation of intraocular pressure or volumertic change of the depressed area with respect to time. Presumably, these factors can be appropriately related to provide a measure of the outflow. However, elastic effects in the cornea, and other variable factors significantly influence the pressure and volume measurements to the extent that a reliable indication of the facility of outflow is difficult, if not impossible, to obtain. Moreover, tonography by means of an indentation tonometer can scratch the cornea. In view of tthe foregoing shortcomings and disadvantages, the full potential of tonography as a highly valuable diagnostic tool in the direction of glaucoma has not been realized.

It is therefore, an object of the present invention to provide improved tonography for indicating facility of outflow with extreme accuracy and reliability and which involves negligible, if any, patient discomfort.

Another object of the invention is the provision of a method and apparatus by which the facility of outflow of an eyeball is determined directly from measurement of the change in intraocular pressure with respect to time resulting from an applied depressing force without regard to changes in the depressed area or volume.

Still another object of the invention is to provide a tonography method and apparatus of the class described whereby a tonometer probe may be employed to depress an eyeball and provide facility of outflow readings which are substantially not affected by elastic effects in the cornea in the vicinity of the probe.

It is a further object of the invention to provide apparatus for applying a tonometer probe to a patient's eyeball with a readily adjustable constant force such that the pressure readings obtained from the probe with respect to time are indicative of the facility of outflow of liquid from the eyeball, or, more directly, of the way in which the eye handles a change in pressure.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 5 is a front elevation view of the tonography apparatus with portions broken away.

FIGURE 6 is a sectional view taken at line 6—6 of FIGURE 5.

FIGURE 7 is a sectional view taken at line 7—7 of FIGURE 6.

In general, the present invention is directed to the measurement of facility of outflow of liquid from the eyeball as an indication of the existence of glaucoma, it being known that glaucoma is often associated with a relatively low facility of outflow. In this regard a method of tonography is provided which is simple, yet relatively accurate, and moreover, which presents negligible danger or discomfort to the patient. In addition, the invention provides preferred apparatus for conducting the method.

Broadly speaking the tonography method of this invention consists in applying a given constant force to the eyeball for an extended period of time while measuring the intraocular pressure within the eyeball during the application of the force. The change of pressure with respect to time is then directly representative of the change of the area of flattening of the eyeball with respect to time under the applied force, which is a measure of the facility of outflow of liquid through the ducts of the eyeball. More particularly, the force applied to the eyeball presses against a localized area thereof to cause liquid to flow out of the eyeball and flatten the area. As the liquid leaves, the intraocular pressure decreases with respect to time to thus increase the flattened area with respect to time. The pressure is equal to the force per unit of flattened area. Since the force is constant, the time rate of change of the area of flattening hence varies in inverse relation to the time rate of change of the intraocular pressure. The greater the decrease of pressure with respect to time, the greater the increase in the area of flattening with respect to time, and therefore the facility of outflow, because flattening takes place in response to fluid outflow. A relatively small rate of pressure decrease is indicative of a poor facility of outflow and therefore is suggestive of the existence of glaucoma.

Figure 1:
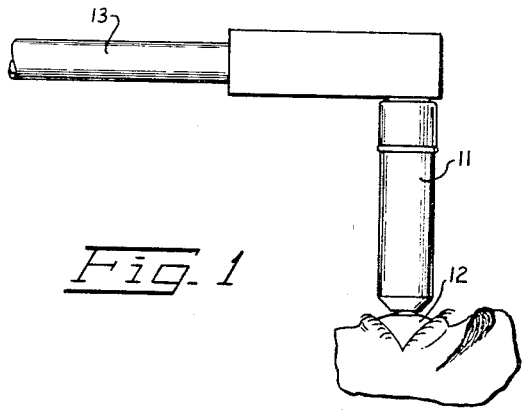
FIGURE 1 is a fragmentary elevational view of tonography apparatus in accordance with the present invention as employed on a patient to measure facility of outflow of liquid through ducts of the eyeball.

Considering now the tonography method in greater detail as to the preferred form thereof, the previously noted intraocular pressure measurement is best accomplished, as illustrated in FIGURE 1, by applying a conventional tonometer probe 11 to a patient's eyeball 12 with a constant force for an extended period of time, and recording the pressure measured by the probe during this period. The probe 11 must be of the type which has a central stiff force transducer effectively within an insensitive coplanar annulus. The term "stiff force transducer" as employed herein in connection with a probe is a transducer with which there is very little motion of the central region of the tip of the probe relative to the surrounding insensitive annulus during measurement. Probes having this characteristic and which are suited to the purposes of the present invention may be variously provided. The probe 11 may be of the type wherein the transducer includes a rod or plunger mounted in the probe by means of a relatively stiff resilient suspension which holds the flat tip of the rod normally coplanar with the surrounding insensitive annulus and permits very slight movement of the rod during pressure measurements. The rod in its movement serves to convey the pressure measurement sensed by the tip of the probe to means contained therein for generating a proportional electrical signal. A probe of the foregoing type is disclosed, for example, in United States Patent No. 3,150,520 to Mackay et al. It should be noted that other probes may be alternatively employed such as those having a diaphragm at the tip of the probe with a central region which is only very slightly movable relative to a surrounding insensitive coplanar annular region, the diaphragm being backed by an air column serving to convey the pressure measurement sensed at the tip to a suitable transducer. In any event, the probe 11 is preferably coupled to a suitable recorder for continuously plotting the signal sensed by the probe with respect to time.

Figures 2, 3:
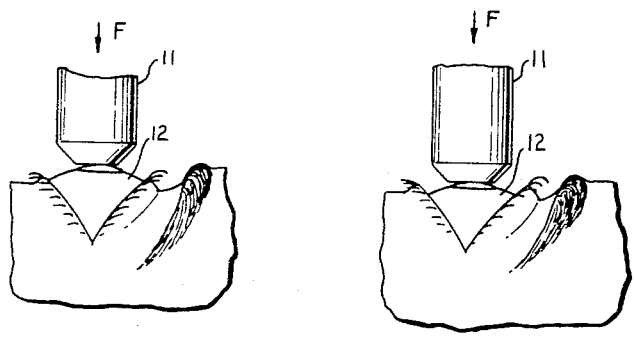
FIGURE 2 is a schematic representation of the relationship of the tonometry probe of the apparatus to the patient's eyeball in the initial stages of the tonography mehod.
FIGURE 3 is a view similar to FIGURE 2, but illustrating the relationship of the tonometry probe to the eyeball in the final stages of the tonography method.
Figure 4:
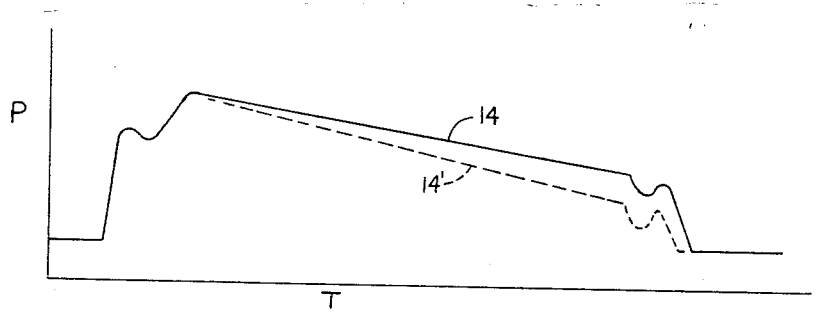
FIGURE 4 is a graph of intraocular pressure versus time as obtained from the tonography probe during the course of the tonography method.

The force with which the probe is applied to the eyeball is very gentle, e.g., of the order of a few dozen grams, and this force is applied and maintained constant as by means of a counterweighted beam 13 of tonography apparatus subsequently described in detail herein. When the probe is initially applied with the constant force, F, a relatively small area of the eyeball 12 is flattened by the probe as indicated in FIGURE 2. As time progresses, the area of flattening increases under the force, F, as indicated in FIGURE 3, liquid being continuously pressed from the eyeball due to the applied force. The probe is typically applied for a period of time of several minutes although in some instances it has been found that a period of several seconds is sufficient. During the period of application the intraocular pressure sensed by the probe is recorded to provide a graph of pressure, P, with respect to time, T, of the type shown in FIGURE 4. The slope of the central portion 14 of the graph is indicative of the facility of outflow of liquid from the eyeball 12. The slope of portion 14 is relatively low and indicates a poor facility of outflow suggestive of the existence of glaucoma. In contrast, the central portion 14' of the dashed curve has a greater slope indicative of a good facility of outflow and the non-existence of glaucoma. It should be noted that the curves depicted in FIGURE 4 have been simplified by the elimination of small regular pulsations due to heart beat; sensitivity of this apparatus to small motions such as associated with breathing is minimal.

It is of importance to note that the tonography method described above provides an indication of the facility of outflow directly from measurement of pressure without consideration of the area or volume of flattening. Moreover, the constant force pressure readings are relatively unaffected by elastic effects in the cornea in the vicinity of the probe. It is of course recognized that smaller elastic effects in the rest of the globe of the eye will somewhat affect the indication, but these affects are smaller and relatively constant. As a result, the measurement is very accurately indicative of the facility of outflow. It will be appreciated that the slight flat probe surface presented to the eye minimizes the likelihood of scratching of the cornea. In addition, the method provides a relatively improved mathematical model of the outflow phenomenon, inasmuch as volumetric considerations are eliminated. In this regard, it may be most useful to consider changes in pressure only without recourse to calculated volume changes or flow facility.

Although a variety of apparatus may be employed to apply the probe 11 to the eye with constant force in accordance with the method of the invention, tonography apparatus of the type illustrated in FIGURES 5-7 is preferred. This apparatus is readily adjustable in height, azimuth, and longitudinal direction so as to facilitate the easy positioning of the probe, as supported by the counterweighted beam 13, in contact with the patient's eye. In addition, the apparatus is arranged to facilitate the ready adjustment of the constant force with which the probe is applied to the eye to different desired values. Basically, the tonography apparatus is a stand including a support base 16 with an elongated upright post 17 extending therefrom. Means are provided to mount the beam 13 upon the post 17 for pivotal movement about a horizontal axis, as indicated at 18, with the probe 11 depending from one end of the beam and a counterweight 19 secured to the other end thereof. The counterweight 19 is threadably secured to the beam or otherwise arranged for translation longitudinally thereof, such that the downward force exerted by the probe upon the eyeball may be precisely varied as desired upon translation of the counterweight. In this regard, the closer the counterweight is to the pivot axis 18, the greater is the downward force of the probe, and vice versa. The probe is electrically connected to a standard strip recorder 20 mounted upon a support bracket 21 at the upper end of the post 17. If a pneumatic link were employed in the probe then a pneumatic recorder would instead be employed. The recorder plots the pressure sensed by the probe with respect to time in a well known manner.

Considering now the preferred structure of the tonography apparatus as to the positional adjustment of the probe noted hereinbefore, it is to be noted that the beam 13 is pivotally mounted upon a U-shaped carrier bracket 22, a bearing 23 being secured to the beam and transversely journalled between the parallel spaced side legs of the bracket. The bracket is translatable longitudinally of a channel shaped guide member 24 having reentrant opposed horizontal shelf portions 26 at its upper end defining a longitudinally extending slot 27 therebetween. The bracket is provided with a depending portion 28 which extends through the slot 27 and is provided with outwardly flared ears 29, or the like, extending beneath the shelf portions to retain the bracket in longitudinal slidable relation to the guide member. In order to translate the bracket, a longitudinal adjusting knob 31 is journalled at one side of the bracket for rotation about a transverse axis. The knob carries a tractive ring 32 of rubber, or the like, which bears upon one of the shelf portions 26 of the guide member 24 and is rotatable with the knob. The surface of the shelf portion engaged by the tractive ring is preferably roughened to provide increased traction therebetween. Thus upon rotation of the knob 31, the tractive ring is wheeled over the shelf portion 26 to thereby translate the bracket 22 and beam 13 longitudinally of the guide member.

Azimuthal and height adjustments of the beam are preferably facilitated by means of an adjustable support mechanism 33 which serves to mount the guide member 24 upon the post 17. The support mechanism includes a housing 34 having a bore 36 extending therethrough for receiving the post in slidable relation. The post is provided with a rack 37, and a latch 38 is mounted in the housing with an end portion extending into the bore 36. The latch is movable into and out of engagement with the teeth of the rack and a spring 39 normally urges the latch into engaged position. An operating pin 41 is secured to the latch and extends through a slot 42 provided in the housing, the pin thereby facilitating movement of the latch between its engaged and disengaged positions. Thus, the pin may be moved in the slot 42 to urge the latch against the loading of spring 39 out of engagement with the rack 37. The housing, and other components supported thereon including the beam 13, may then be moved up or down upon the post 17 to any desired height and locked in position upon releasing the pin, the spring urging the latch into locking engagement with the rack.

The support mechanism 33 further includes a shaft 43 fixedly secured to the guide member 24 in depending relation thereto and extending through the top of the housing 34. The shaft, and guide member secured thereto, are rotatable relative to the housing about a vertical axis. A yoke 44 is fixedly secured to the shaft 43 and pivotally mounted within the housing for rotation about the shaft axis. Rotation of the yoke effects rotation of the shaft and guide member. Selective rotation of the yoke effects rotation of the shaft and guide member. Selective rotation of the yoke is preferably facilitated by means of a nut 46 secured between vertically spaced legs of the yoke by vertical pivot pins 47 so as to be rotatable about a vertical axis. A lead screw 48 journalled transversely of the housing threadably engages the nut 46, and an adjusting knob 49 is secured to an end of the screw which projects externally of the housing. Upon twisting the knob 49 to rotate the screw, the nut is translated therealong to in turn rotate the yoke 44. The shaft 43 and guide member 24 are hence rotated about a vertical axis to thereby vary the azimuthal position of the beam 13.

As a further important feature of the tonography apparatus, it is to be noted that means are provided to facilitate the ready calibration of the recorder 20 in conjunction with the output signal from the probe 11. In the usual calibration procedure, the probe is turned from a vertically upwards to downwards position and the amplitude of the resulting trace on the recorder is appropriately adjusted to a predetermined amplitude, thus assuring that a known force will produce an expected output in this overall system. In order that this turning over of the probe 11 may be readily accomplished, a mounting head 51 is rotatably coaxially disposed on the beam 13, and the probe is secured to the head in perpendicular relation to the axis thereof. It will be thus appreciated that the probe may be thus turned over between vertically upwards and downwards positions by rotating the head. In order to index these positions, short longitudinally extending diametrically opposed slots 52 are formed in the upper and lower portions of the beam adjacent the end. The inner ends of the slots 52 are connected by a 180° circumferential slot 53, and a follower element 54 projects inwardly from the head into engagement with the slots. In addition, a spring 56 is disposed between the head and end of the beam to normally urge the head outwardly of the beam. Thus, with the follower element 54 positioned in either of the slots 52, the spring 56 urges the head outwardly to engage the element with the outer end of the slot and lock the head in a position where the probe 11 is either vertically upwards or downwards. To reverse the position of the probe, the head is depressed to position the follower element in the slot 53, and the head is twisted 180° to position the follower element at the opposite end thereof in alignment with the longitudinal slot 52 thereat. The spring then urges the head outwardly to engage the follower element with the outer end of the longitudinal slot and lock the head in the desired position of vertical orientation of the probe.

With the tonography apparatus provided in the manner described above, it will be appreciated that measurement of the way in which an increased pressure is handled and of the facility of outflow of a patient's eyeball may be readily accomplished in accordance with the method of the invention. Preliminarily, the recorder 20 may be calibrated upon turning the probe 11 from vertically upwards to vertically downwards position, this being accomplished by depressing and twisting the mounting head 51 upon the beam 13 in the manner previously described. The counterweight 19 is translated longitudinally of the beam 13 to a position productive of the desired constant force with which the probe is to be applied to the eyeball. With the patient reclining, the pin 41 is manipulated to release the housing, and the latter is moved to a suitable height upon the post 17 wherein the probe will contact the patient's eyeball, whereupon the pin is released to lock the housing in position. Similarly, the knobs 31 and 49 are manipulated to suitably adjust the longitudinal and azimuthal positions of the probe such that the latter will contact the desired area of the eyeball. With the recorder 20 energized, the beam is released to permit the probe to contact the patient's eyeball with the predetermined constant force. The recorder traces a continuous graph of the patient's intraocular pressure with respect to time over an extended period, after which the beam 13 may be pivoted to move the probe out of contact with the eyeball. The graph provides an indication of the facility of outflow in the manner previously described.

What is claimed is:

1. A tonography method comprising applying a constant force to an eyeball for an extended period of time while measuring the change in intraocular pressure within the eyeball with respect to time during said application of constant force.

2. A method of directly measuring intraocular pressure within an eyeball comprising applying a pressure sensitive probe to an eyeball with constant force for an extended period of time to generate a signal proportional to intraocular pressure sensed by said probe, and continuously recording said signal with respect to time as an indication of intraocular pressure variation in response to the application of said force.

3. A method of tonography comprising applying a minimally movable flat surface portion of a stiff force pressure sensitive transducer and surrounding pressure insensitive coplanar annulus to an eyeball with a constant force for an extended period of time to generate a transducer signal directly representative of intraocular pressure, and observing said signal during said period as a direct indication of intraocular pressure variation due to outflow of liquid from said eyeball.

4. A method according to claim 3, further characterized by continuously recording said signal during said period to provide a graph indicative of intraocular pressure versus time, and observing the slope of the central region of said graph as an indication of the facility of outflow of liquid from the eyeball.

References Cited

UNITED STATES PATENTS

| 2,366,645 | 1/1945 | Ollendorff | 73—80 |
| 3,049,001 | 8/1962 | Mackay et al. | 73—80 |
| 3,070,997 | 1/1963 | Paprit et al. | 73—80 |
| 3,150,520 | 9/1964 | Mackay et al. | 73—80 |
| 3,184,960 | 5/1965 | Murr et al. | 73—80 |

FOREIGN PATENTS

| 858,663 | 11/1940 | France. |

RICHARD C. QUEISSER, *Primary Examiner.*

C. I. McCLELLAND, *Assistant Examiner.*